(12) United States Patent
Xiong et al.

(10) Patent No.: US 12,452,567 B2
(45) Date of Patent: Oct. 21, 2025

(54) COMBO OPTICAL NETWORK UNIT OPTICAL MODULE CIRCUIT

(71) Applicant: POTRON TECHNOLOGY CO., LTD., Shenzhen (CN)

(72) Inventors: Fusheng Xiong, Shenzhen (CN); Hailiang Jin, Shenzhen (CN); Sijun Wang, Shenzhen (CN); Xianghui Zhang, Shenzhen (CN); Lin Wu, Shenzhen (CN); Jixun Ju, Shenzhen (CN)

(73) Assignee: POTRON TECHNOLOGY CO., LTD., Shenzhen (CN)

( * ) Notice: Subject to any disclaimer, the term of this patent is extended or adjusted under 35 U.S.C. 154(b) by 248 days.

(21) Appl. No.: 18/310,553

(22) Filed: May 2, 2023

(65) Prior Publication Data

US 2024/0107208 A1  Mar. 28, 2024

(30) Foreign Application Priority Data

Sep. 23, 2022  (CN) .......................... 202211167367.3

(51) Int. Cl.
*H04Q 11/00* (2006.01)
(52) U.S. Cl.
CPC ..... *H04Q 11/0067* (2013.01); *H04Q 11/0005* (2013.01)
(58) Field of Classification Search
None
See application file for complete search history.

(56) References Cited

U.S. PATENT DOCUMENTS

2020/0351577 A1  11/2020  Valencia

FOREIGN PATENT DOCUMENTS

| CN | 205051829 U |   | 2/2016 |
| CN | 111212338 A |   | 5/2020 |
| CN | 214045639 U | * | 8/2021 |
| CN | 114667051 A |   | 6/2022 |
| JP | 2013197830 A |   | 9/2013 |

OTHER PUBLICATIONS

European Search Report, European Application No. 23198999.7, mailed Feb. 28, 2024 (11 pages).
European First Examination, European Application No. 23198999.7, mailed Jul. 3, 2024 (6 pages).
SIPO, First Examination, Chinese Application No. 202211167367.3, mailed May 21, 2024 (11 pages).

* cited by examiner

*Primary Examiner* — David W Lambert

(57) ABSTRACT

A COMBO ONU optical module circuit is provided, including a MCU control circuit, a XGSPON ONU circuit, and a GPON ONU circuit. The MCU control circuit includes three control units. The first control unit is configured to determine a transmission channel according to a signal level. The second control unit is configured to switch between a TX_SD_10G signal and a TX_SD_1G signal. The third control unit is configured to supply power to the GPONG ONU circuit using PWR_1G control or the XGSPONG ONU circuit using PWR_10G control. The first control unit is further configured to control the XGSPON ONU circuit and the GPON ONU circuit in an I2C communication mode. Under control of the first control unit, the XGSPON ONU circuit is configured to receive and emit a 10G optical signal, and the GPON ONU circuit is configured to receive and emit a 2.5G optical signal.

10 Claims, 9 Drawing Sheets

COMBO OPTICAL NETWORK UNIT OPTICAL MODULE CIRCUIT

TECHNICAL FIELD

The present disclosure relates to the technical field of circuits, and in particular to a COMBO ONU optical module circuit.

BACKGROUND

Currently, optical communication market has a promising prospect, which puts forward great requirements for optical modules and great demands for the output of optical module manufacturers. A COMBO optical network unit (ONU) optical module can use a Gigabit passive optical network (GPON) ONU or a 10-gigabit symmetric passive optical network (XGSPON) ONU for optical transmission.

The XGSPON, 10-Gigabit-capable symmetric passive optical network, provides symmetric 10G transmission (maximum downstream line rate of 9.953 Gbit/s, maximum upstream line rate of 9.953 Gbit/s). The GPON operates at 2.5 Gbps (downstream of 2.488 Gbit/s, upstream of 1.244 Gbit/s).

However, in the related art, using either of the XGSPON ONU and the GPON ONU for optical transmission needs manual operation, thereby leading to a complicated process.

SUMMARY

The objective of the present disclosure is to provide a COMBO ONU optical module circuit, to solve the problems in the related art that the transmission process is complicated. The specific technical solutions are described below.

A first aspect provides a COMBO ONU optical module circuit, including a microcontroller unit (MCU) control circuit, a 10-gigabit symmetric passive optical network (XGSPON) ONU circuit, and a gigabit passive optical network (GPON) ONU circuit. The MCU control circuit includes a first control unit, a second control unit, and a third control unit. The first control unit is configured to determine a transmission channel according to a level of an input signal, where a high level indicates an XGSPON ONU input state, and a low level indicates a GPON ONU input state. The second control unit is configured to switch between a TX_SD 10G signal and a TX_SD 1G signal, the TX_SD 10G signal is configured to indicate to switch to the XGSPON ONU input state, and the TX_SD 1G signal is configured to indicate to switch to the GPON ONU input state. The third control unit is configured to realize a slow start function of an optical module, and is further configured to supply power to the GPONG ONU circuit using control under an optical transmission rate of 1G, or supply power to the XGSPONG ONU circuit using control under an optical transmission rate of 10G. The first control unit is further configured to control the XGSPON ONU circuit through a first serial clock port and a first serial data port in an inter integrated circuit communication mode, or control the GPON ONU circuit through a second serial clock port and a second serial data port in an I2C communication mode. The XGSPON ONU circuit is configured to receive and emit a 10G optical signal according to the control of the first control unit. The GPON ONU circuit is configured to receive and emit a 2.5G optical signal according to the control of the first control unit.

Furthermore, the XGSPON ONU circuit includes a first low-power burst mode laser driver and a mirror current transistor. The first low-power burst mode laser driver is connected to a first receiver optical subassembly and a first transmitter optical subassembly respectively, the first receiver optical subassembly is configured to receive the 10G optical signal, and the first transmitter optical subassembly is configured to transmit the 10G optical signal. The mirror current transistor is connected to the MCU control circuit and the first receiver optical subassembly respectively.

Furthermore, the low-power burst-mode laser driver includes a gold finger TD− port, a gold finger RD− port, and a gold finger RD+ port. The gold finger TD− port is an input terminal of a transmitter modulation signal of the XGSPON ONU circuit. The gold finger RD− port and the gold finger RD+ port are output terminals of a differential receiving electrical signal of the XGSPON ONU circuit.

Furthermore, the mirror current transistor includes a first interface, a second interface, a third interface, and a fourth interface. The first interface and the second interface are connected to a fifth interface, and connected to an RXSLEEP interface of the low-power burst-mode laser driver, and configured to perform current detection on an avalanche photodiode current of the first receiver optical subassembly. The third interface and the fourth interface are connected to a sixth interface, and connected to a VAPD interface of the first receiver optical subassembly, and configured for an avalanche photodiode voltage.

Furthermore, the XGSPON ONU circuit further includes a field effect transistor, a diode, and a first inductor. A gate of the field effect transistor is a pulse width modulation input, and is connected to a GDRV port of the third control unit, and a source of the field effect transistor is grounded. A first end of the diode is connected to a drain of the field effect transistor, and a second end of the diode is grounded through a capacitor and a resistor, wherein the capacitor and the resistor are in parallel connection. A first end of the first inductor is connected to the drain of the field effect transistor and the first end of the diode, and a second end of the first inductor is connected to a power supply through a second inductor. The field effect transistor, the diode, and the inductor form a direct current (DC)-DC voltage boost circuit.

Furthermore, the GPON ONU circuit includes a second low-power burst mode laser driver. The second low-power burst mode laser driver is connected to a second receiver optical subassembly and a second transmitter optical subassembly, The second receiver optical subassembly is configured to receive the 2.5G optical signal, and the second transmitter optical subassembly is configured to transmit the 2.5G optical signal.

Furthermore, the second low-power burst mode laser driver includes a gold finger RD− port, a gold finger RD+ port, and a gold finger TD+ port. The gold finger RD− port and the gold finger RD+ port are input terminals of a differential electrical signal of the GPON ONU circuit. The gold finger TD+ port is an input terminal of a transmitter electrical signal of the GPON ONU circuit.

Furthermore, the second receiver optical subassembly includes a received signal strength indicator (RSSI) port. The received signal strength indicator port is connected to a DCV/ADCI port of the second low-power burst mode laser driver, and is configured to monitor a current of an RSSI.

Furthermore, the first control unit includes an RX LOS port. The RX LOS port is configured to perform optical anomaly detection, and alarm in a case of optical signal loss.

Furthermore, the first control unit includes a gold finger H1-4 port and a gold finger H1-5 port. The gold finger H1-4 port and the gold finger H1-5 port are configured to control the optical module, the gold finger H1-4 port is configured to receive a serial data (SDA) input, the gold finger H1-5 port is configured to receive an external clock input.

The embodiments of the present disclosure have the following beneficial effects.

According to the COMBO ONU optical module circuit provided in the embodiments of the present disclosure, the control circuit determines whether the XGSPON ONU circuit or the GPON ONU circuit is used according to the level of an input signal; then, switches to the corresponding circuit, and supplies power to the corresponding circuit; and finally, uses the corresponding circuit for optical signal transmission. There is no need to manually switch the circuits, thereby reducing the complexity of optical signal transmission.

It will be appreciated that it is not necessarily necessary to implement any of the products or methods of the present disclosure to realize all the advantages at the same time.

BRIEF DESCRIPTION OF THE DRAWINGS

In order to more clearly illustrate the technical solutions in the present disclosure or in the related art, a brief description of the drawings required for use in the present disclosure or in the description of the related art is described below. It will be appreciated that other drawings can be obtained from these drawings by those skilled in the art without creative effort.

DETAILED DESCRIPTION OF THE EMBODIMENTS

In order to make the purpose, technical solutions and advantages of the present disclosure clearer, the technical solutions in the present disclosure are described in combination with the accompanying drawings. It will be appreciated that the described embodiments are a part of the embodiments of the present disclosure, but not all of them. On the basis of the embodiments in the present disclosure, all other embodiments acquired by those skilled in the art without creative work shall fall within the scope of protection in the present disclosure.

In the subsequent description, suffixes such as "module", "component" or "unit" used to denote elements are merely for the description of the present disclosure and have no particular meaning in themselves. Therefore, "module" and "component" can be used in a mixed way.

The present disclosure provides a COMBO ONU optical module circuit, which can reduce the complexity of optical transmission process.

Figure 1:
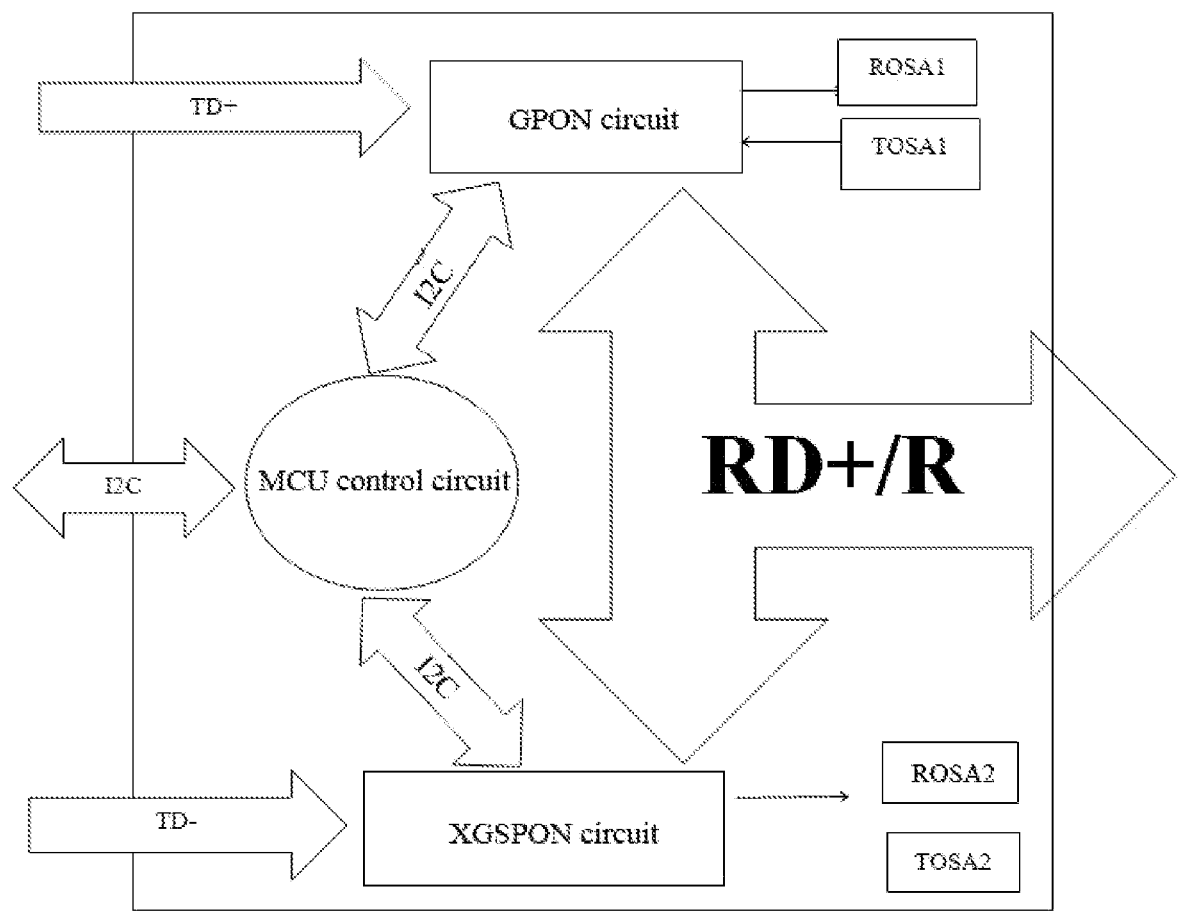
FIG. 1 is a block diagram of a COMBO ONU optical module circuit according to an embodiment of the present disclosure.

In the following, the COMBO ONU optical module circuit provided herein is described in combination with the specific embodiments. FIG. 1 is a block diagram of the COMBO ONU optical module circuit.

The COMBO ONU optical module circuit includes a MCU control circuit, a XGSPON ONU circuit, and a GPON ONU circuit. The MCU control circuit performs data transmission with an external serial clock (SCL) port and a serial data (SDA) port in an I2C communication mode, and controls the XGSPON ONU circuit and the GPON ONU circuit in the I2C communication mode. The TD+/TD− differential signal is split into two signals, which are respectively used for the XGSPON ONU circuit and the GPON ONU circuit. The RD+/RD− differential signal may be used for the XGSPO ONU circuit and the GPON ONU circuit at different times. The XGSPON ONU circuit is connected to a first receiver optical subassembly ROSA2 and a first transmitter optical subassembly TOSA2 respectively. The GPON ONU circuit is connected to a second receiver optical subassembly ROSA1 and a second transmitter optical subassembly TOSA1 respectively.

According to the present disclosure, the control circuit determines whether the XGSPON ONU circuit or the GPON ONU circuit is used according to the level. Then, the control circuit switches to the corresponding circuit, and supplies power to the corresponding circuit. Finally, the control circuit uses the corresponding circuit for optical signal transmission. There is no need to manually switch the circuits, thereby reducing the complexity of optical signal transmission.

The MCU control circuit includes a first control unit U1, a second control unit U7, and a third control unit U2.

Figure 2:
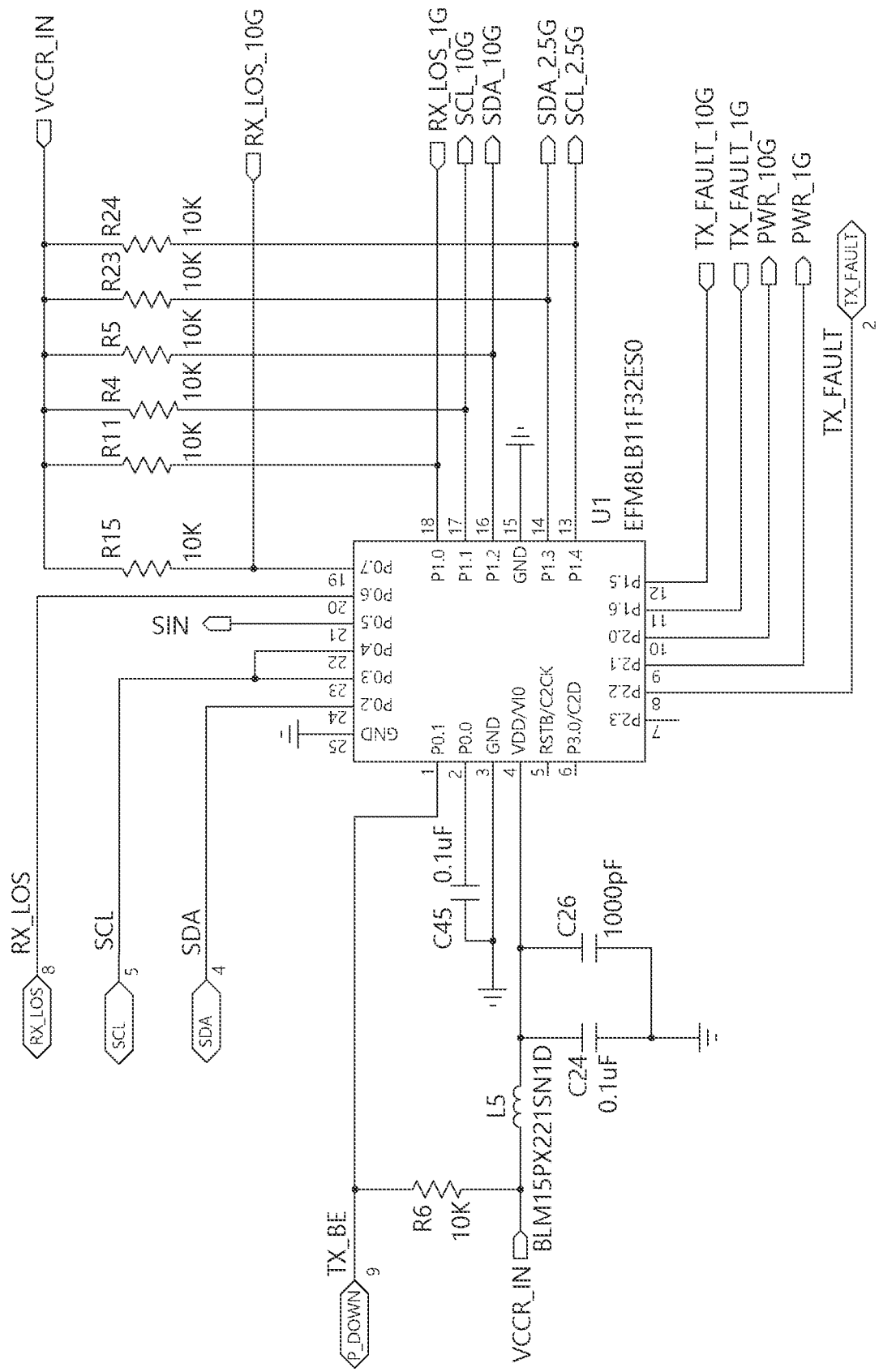
FIG. 2 is a circuit diagram of a first control unit according to an embodiment of the present disclosure.

FIG. 2 is a circuit diagram of the first control unit.

The first control unit U1 uses the EFM8LB11F32ES0 chip, to control the whole circuit. The SCL port is the serial clock port, and the SDA port is the serial data port. Through the two ports, the chip performs data transmission with the external clock and data in the I2C communication mode. Specifically, the first control unit U1 controls, through a first serial clock port SCL 10G and a first serial data port SDA 10G, the XGSPON ONU circuit in the I2C communication mode; or controls, through a second serial clock port SCL 2.5G and a second serial data port SDA 2.5G, the GPON ONU circuit in the I2C communication mode. The RX LOS port is the port for alarming in the case of optical signal loss, which is configured to perform optical anomaly detection. The gold finger H1-4 port (the port corresponding to the 4th gold finger of the EFM8LB11F32ES0 chip, namely the SDA port) is configured to receive the external SDA input, and the gold finger H1-5 port (the port corresponding to the 5th gold finger of the EFM8LB11F32ES0 chip, namely the SCL port) is configured to receive the external clock input, which are configured to control optical the optical module. The first control unit U1 determines the transmission channel according to the level of an input signal. A high level indicates a XGSPON ONU input state, and a low level indicates a GPON ONU input state.

Figure 3:
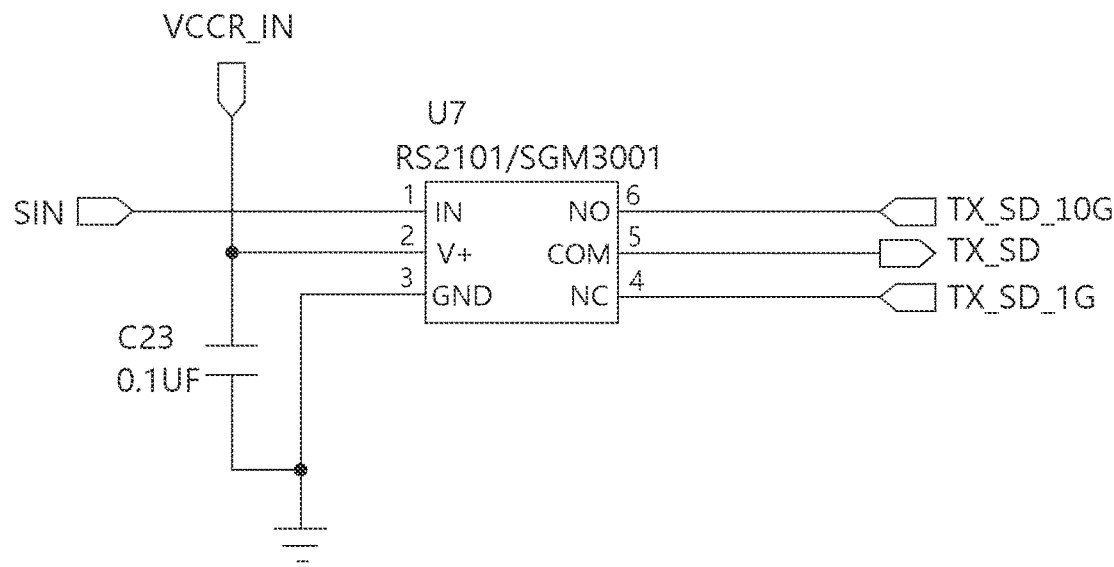
FIG. 3 is a circuit diagram of a second control unit according to an embodiment of the present disclosure.

FIG. 3 is a circuit diagram of the second control unit.

The second control unit U7 uses the RS2101/SGM3001 chip, which is an analog switch chip, and is configured to switch between a TX_SD_10G signal and a TX_SD_1G signal. The TX_SD_10G signal is configured to indicate to switch to the XGSPON ONU input state, and the TX_SD_1G signal is configured to indicate to switch to the GPON ONU input state.

Figure 4:
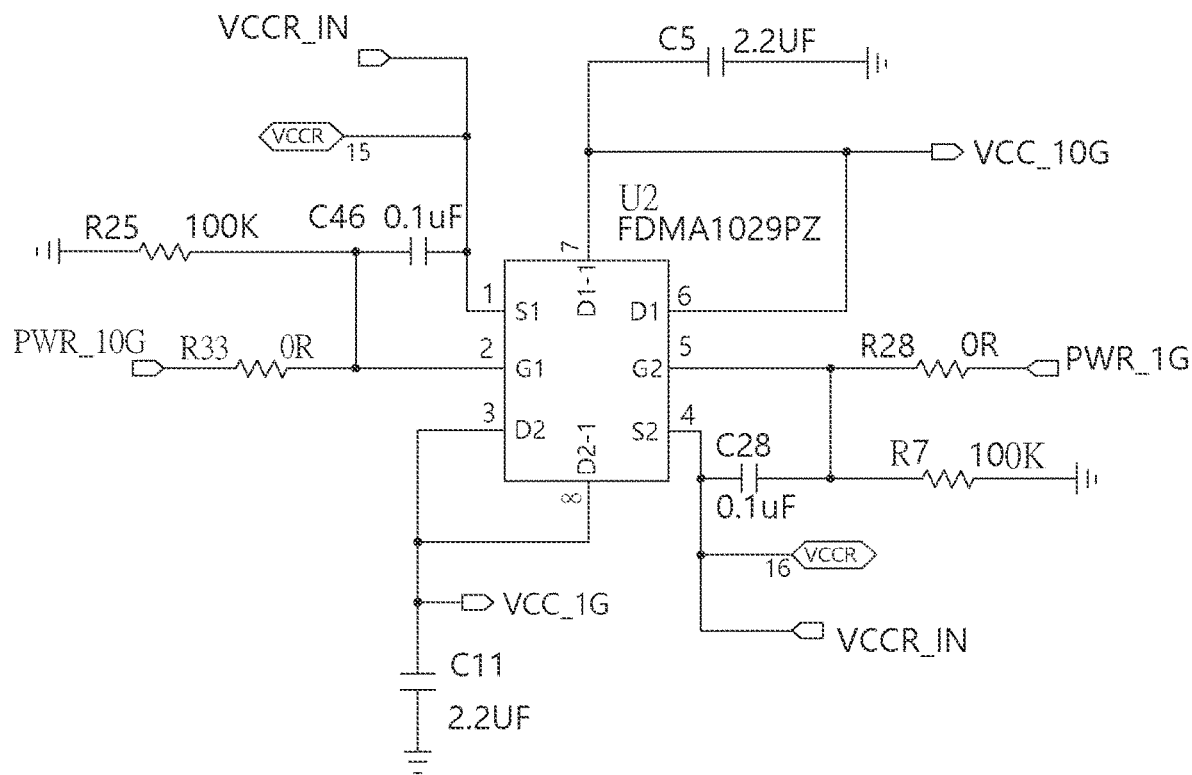
FIG. 4 is a circuit diagram of a third control unit according to an embodiment of the present disclosure.

FIG. 4 is a circuit diagram of the third control unit.

The third control unit U2 uses the FDMA1029PZ chip, which includes two independent P-channel MOSFETs, to realize a slow start function of the optical module. The third control unit U2 is configured to supply power to the GPONG ONU circuit by using control under an optical transmission rate of 1G, or supply power to the XGSPONG ONU circuit by using control under an optical transmission rate of 10G.

In the case that the first control unit U1 detects a high level, it indicates that the XGSPON ONU input state is to be entered. The second control unit U7 receives the TX_SD_10G signal, and switches to the XGSPON ONU input state. The third control unit U2 supplies power to the XGSPONG ONU circuit by using the control under the optical transmission rate of 10G. The XGSPON ONU circuit is configured to receive and emit a 10G optical signal under the control of the first control unit U1.

In the case that the first control unit U1 detects a low level, it indicates that the GPON ONU input state is to be entered. The second control unit U7 receives the TX_SD_1G signal, and switches to the GPON ONU input state. The third control unit U2 supplies power to the GPONG ONU circuit by using the control under the optical transmission rate of 1G. The GPON ONU circuit is configured to receive and emit a 2.5G optical signal under the control of the first control unit U1.

Figure 5:
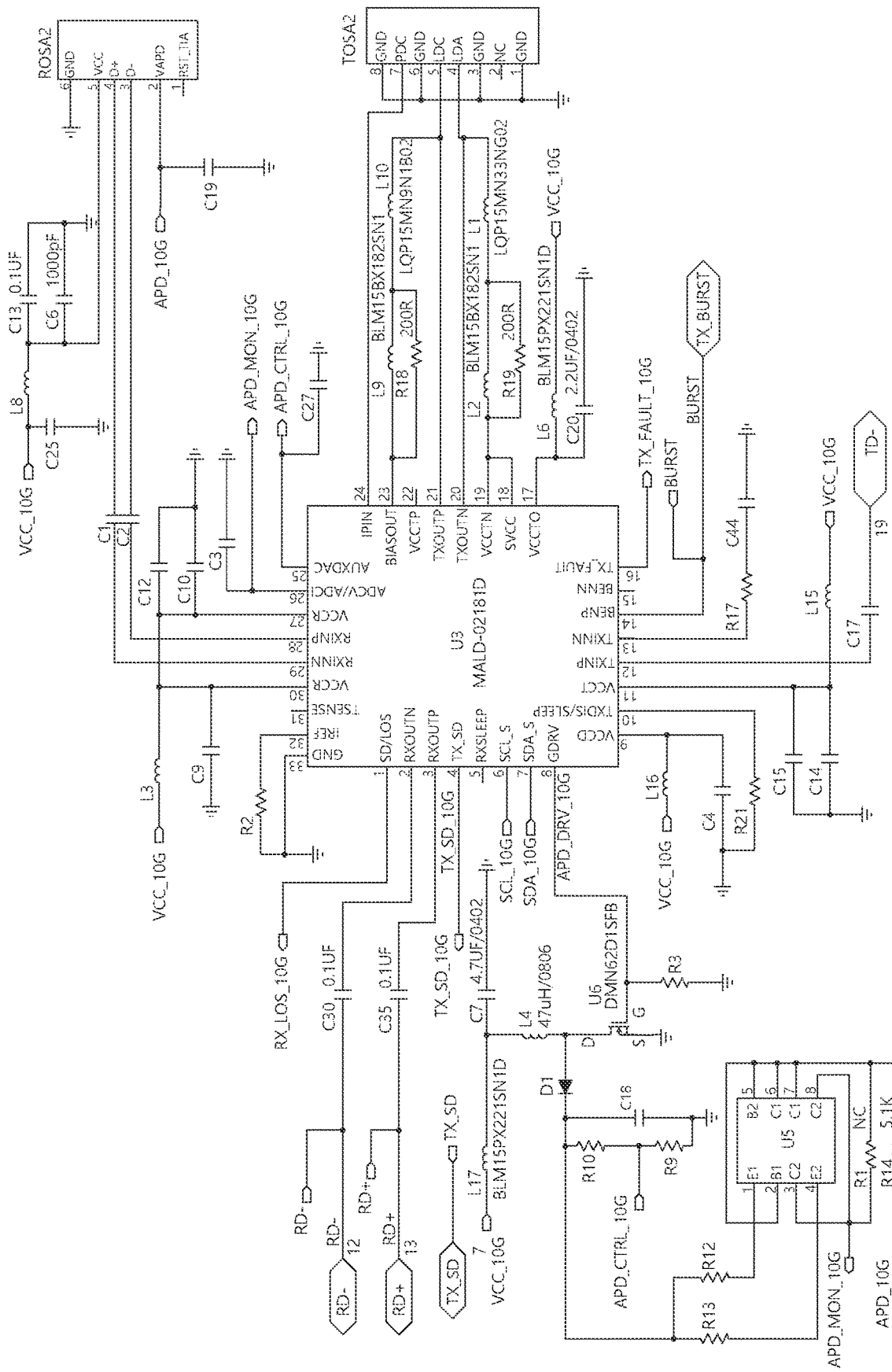
FIG. 5 is a circuit diagram of a XGSPON ONU circuit according to an embodiment of the present disclosure.

FIG. 5 is a circuit diagram of the XGSPON ONU circuit.

The XGSPON ONU circuit includes a low-power burst mode laser driver U3 and a mirror current transistor U5.

Figure 6:
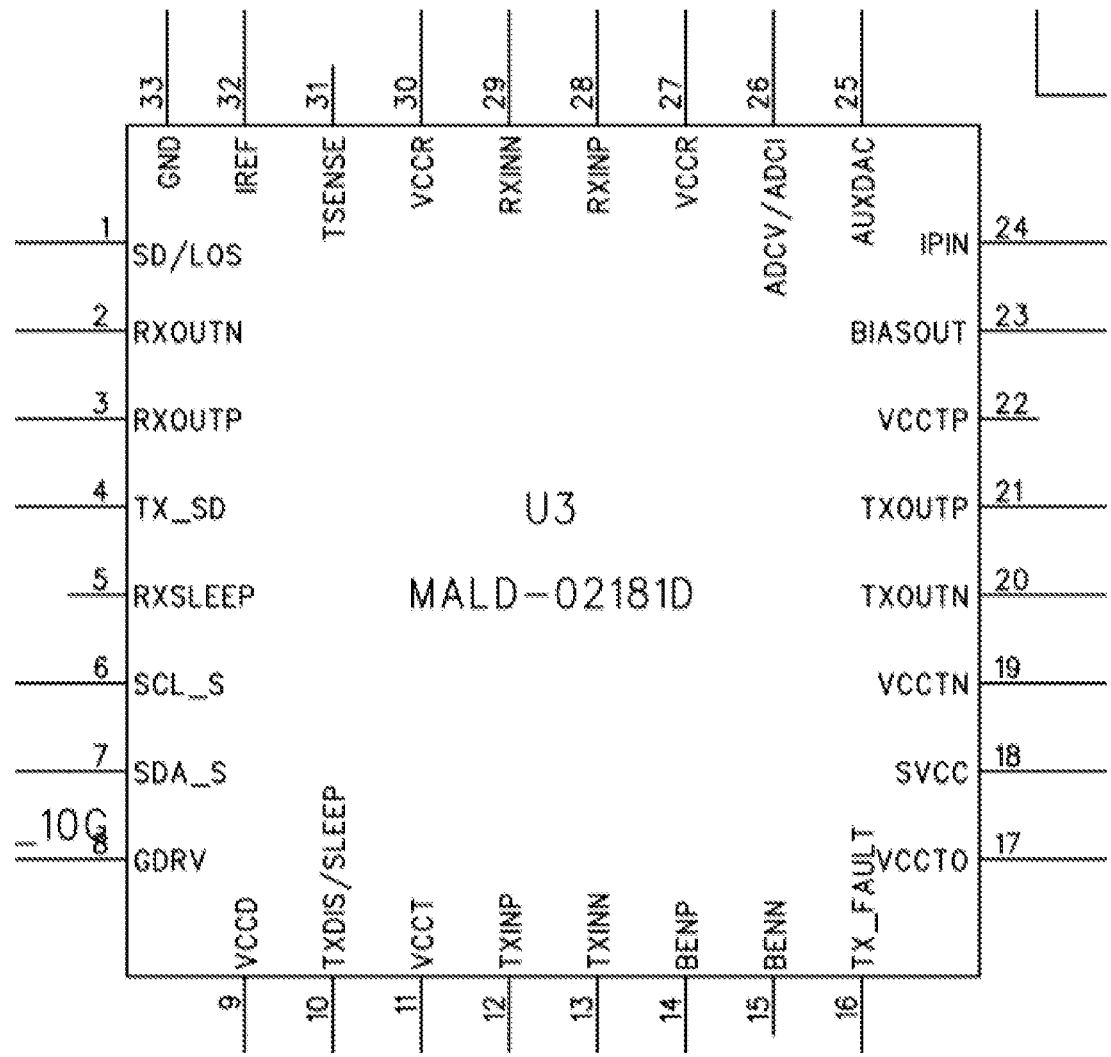
FIG. 6 is an enlarged schematic diagram of a MALD-02181D chip according to an embodiment of the present disclosure.
Figure 7:
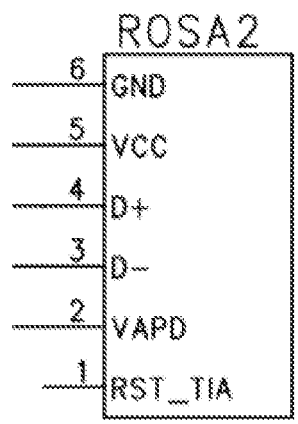
FIG. 7 is an enlarged schematic diagram of a first receiver optical subassembly according to an embodiment of the present disclosure.
Figure 8:
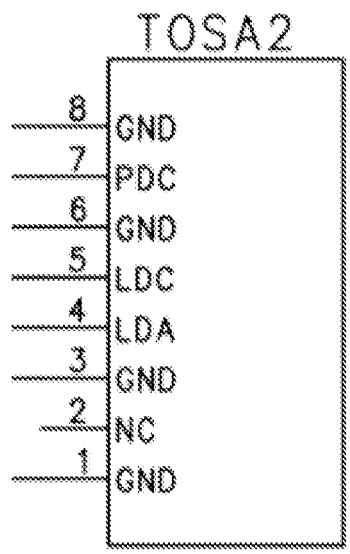
FIG. 8 is an enlarged schematic diagram of a first transmitter optical subassembly according to an embodiment of the present disclosure.

FIG. 6 is an enlarged schematic diagram of the MALD-02181D chip. The low-power burst mode laser driver U3 uses the MALD-02181D low-power burst mode laser driver. To enable the laser to work normally, the low-power burst mode laser driver U3 is connected to the first ROSA2 and the first transmitter optical subassembly TOSA2 respectively. The first ROSA2 is configured to receive the 10G optical signal, and the first transmitter optical subassembly TOSA2 is configured to transmit the 10G optical signal. FIG. 7 is an enlarged schematic diagram of the first ROSA2, and FIG. 8 is an enlarged schematic diagram of the first transmitter optical subassembly TOSA2.

The gold finger TD− port of the low-power burst mode laser driver U3 is the input terminal of the transmitter modulation signal of the XGSPON ONU circuit. The gold finger RD− port and the gold finger RD+ port of the low-power burst mode laser driver U3 are the output terminals of the differential receiving electrical signal of the XGSPON ONU circuit.

The mirror current transistor U5 is connected to the MCU control circuit and the first ROSA2 respectively. The first interface at the 3rd pin and the second interface at the 8th pin of the mirror current transistor U5 are connected to a fifth signal APD MON 10G, and connected to the RXSLEEP interface of the low-power burst mode laser driver U3, which is configured to monitor the APD current of the first ROSA2. The third interface at the 6rd pin and the fourth interface at the 7th pin of the mirror current transistor U5 are connected to a sixth interface APD 10G, and connected to the VAPD interface at the 2rd pin of the first ROSA2, which is configured for the use of the APD voltage.

The XGSPON ONU circuit further includes a field effect transistor U6, a diode D1, and a first inductor L4. The field effect transistor U6, the diode D1, and the first inductor L4 form a DC-DC boost circuit. The gate of the field effect transistor U6 is a PWM input and is connected to the GDRV port at the 8th pin of the low-power burst mode laser driver U3, and the source of the field effect transistor U6 is grounded. An end of the diode D1 is connected to the drain of the field effect transistor U6, and the other end of the diode D1 is grounded through a capacitor and a resistor that are in parallel connection. An end of the first inductor L4 is connected to the drain of the field effect transistor U6 and the end of the diode D1, and the other end of the first inductor L4 is connected to the power supply signal (VCC_10G) through a second inductor L17.

Figure 9:
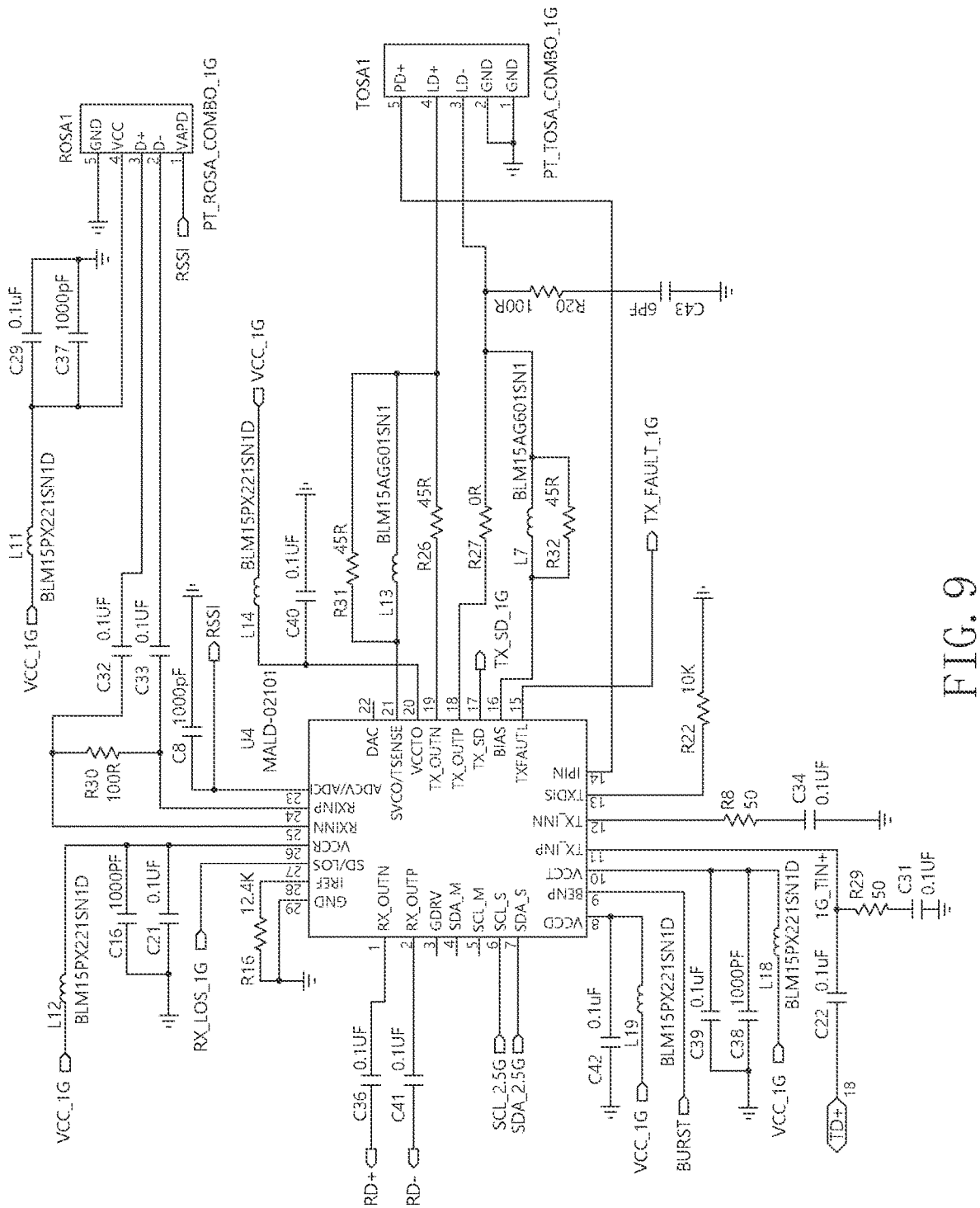
FIG. 9 is a circuit diagram of a GPON ONU circuit according to an embodiment of the present disclosure.

FIG. 9 is a circuit diagram of the GPON ONU circuit.

Figure 10:
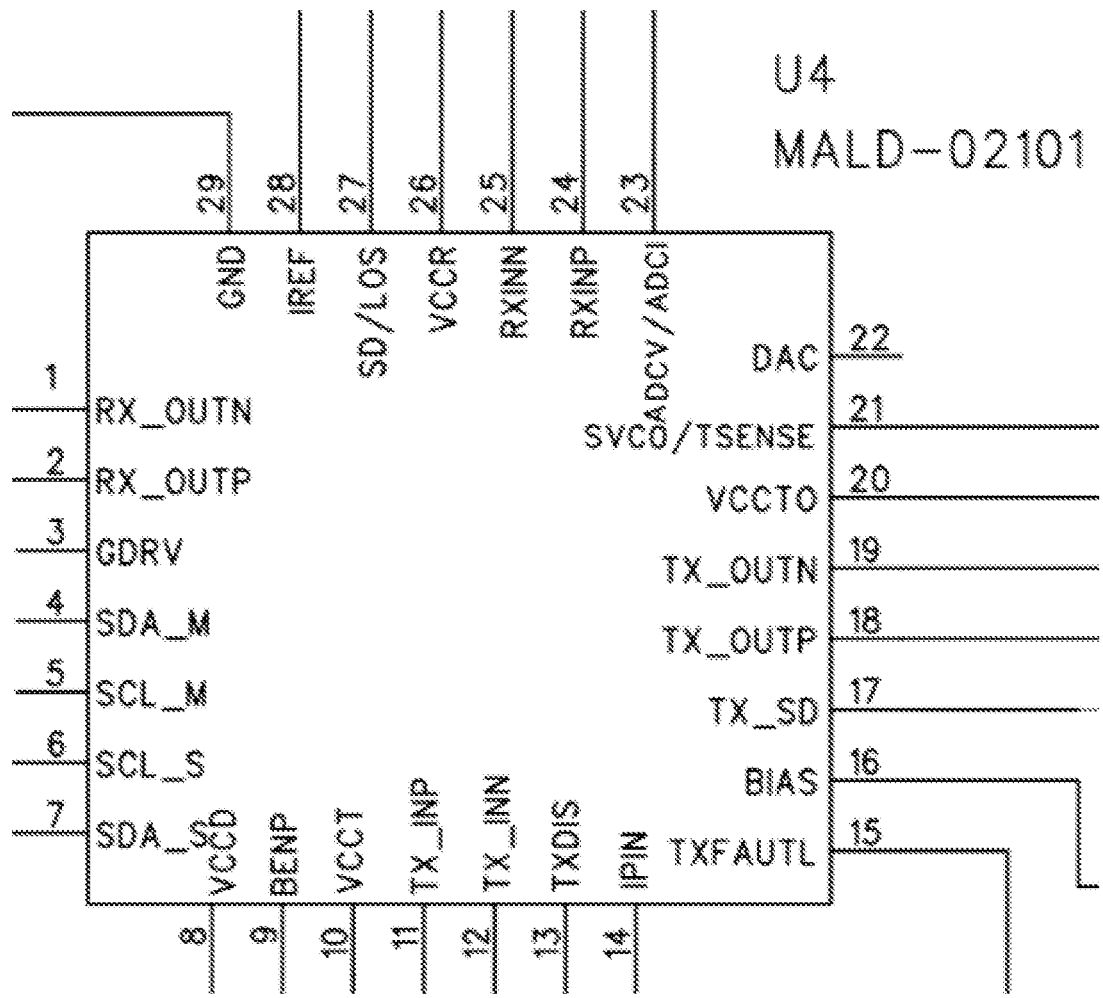
FIG. 10 is an enlarged schematic diagram of a MALD-02101 chip according to an embodiment of the present disclosure.
Figure 11:
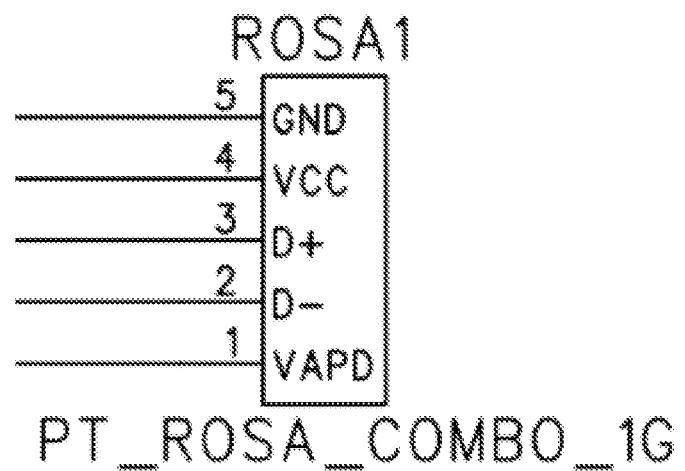
FIG. 11 is an enlarged schematic diagram of a second receiver optical subassembly according to an embodiment of the present disclosure.
Figure 12:
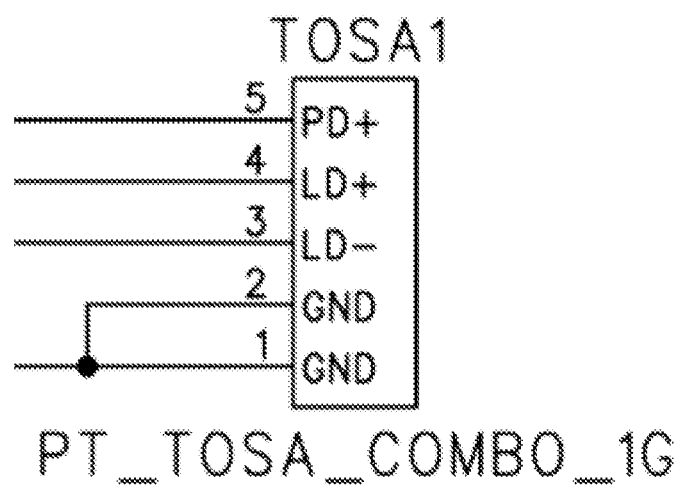
FIG. 12 is an enlarged schematic diagram of a second transmitter optical subassembly according to an embodiment of the present disclosure.

The GPON ONU circuit includes a second low-power burst-mode laser driver U4, which uses the MALD-02101 chip. FIG. 10 is an enlarged schematic diagram of the MALD-02101 chip. The second low-power burst-mode laser driver U4 is connected to the second receiver optical subassembly ROSA1 and the second transmitter optical subassembly TOSA1 respectively. The second receiver optical subassembly ROSA1 is configured to receive the 2.5G optical signal, and the second transmitter optical subassembly TOSA1 is configured to transmit the 2.5G optical signal. FIG. 11 is an enlarged diagram of the second receiver optical subassembly ROSA1, and FIG. 12 is an enlarged diagram of the second transmitter optical subassembly TOSA1. The gold finger RD− port and the gold finger RD+ port are the input terminals of the differential electrical signal of the GPON ONU circuit. The gold finger TD+ port is the input terminal of the transmitter electrical signal of the GPON ONU circuit. The RSSI port corresponding to the 1st pin of the second receiver optical subassembly ROSA1 is connected to the DCV/ADCI port corresponding to the 23th pin of the second low-power burst-mode laser driver U4, and is configured to monitor the current of a RS SI component.

According to another aspect, an embodiment of the present disclosure provides a COMBO ONU optical control method. According to the method, an upper computer determines the amplitude of a to-be-transmitted optical signal and transmits the optical signal to the MCU control circuit. The MCU control circuit determines whether the XGSPON ONU circuit or the GPON ONU circuit is used for optical signal transmission according to a level, and then supplies power to the corresponding transmission circuit, and finally uses the corresponding transmission circuit for optical signal transmission.

According to another aspect, an embodiment of the present disclosure provides an electronic device, including a memory, a processor, a communication interface, and a communication bus. The memory stores a computer program that can run on the processor. The memory and the processor are communicated through the communication interface and the communication bus. The processor is configured to implement the steps of the foregoing method when executing the computer program.

The memory and the processor in the electronic device are communicated through the communication bus and the communication interface. The communication bus may be a peripheral component interconnect (PCI) bus or an extended industry standard architecture (EISA) bus. The communication bus may be an address bus, a data bus, or a control bus.

The memory may include a random access memory (RAM) or a non-volatile memory, such as at least one disk memory. Optionally, the memory may be at least one storage apparatus that is far away from the processor.

The processor may be a general-purpose processor, including a central processing unit (CPU), a network processor (NP), and the like. Alternatively, the processor may be a digital signal processor (DSP), an application specific integrated circuit (ASIC), a field-programmable gate array (FPGA), or other programmable logic components, discrete gates or transistor logic components, discrete hardware components.

According to another aspect, an embodiment of the present disclosure provides a computer-readable medium, which has a non-volatile program code that is executable by a processor.

Optionally, in an embodiment of the present disclosure, the computer-readable medium is configured to store the program code for the processor to execute the foregoing method.

Optionally, the specific embodiments may refer to the foregoing embodiments, which are not detailed herein.

The specific implementations of the embodiments of the present disclosure may refer to the foregoing embodiments, which have corresponding technical effects.

It will be appreciated that the foregoing embodiments can be implemented in hardware, software, firmware, middleware, microcode, or a combination thereof. In the form of hardware implementation, the processing unit can be implemented in one or more of ASICs, DSPs, DSP devices (DSPD), programmable logic devices (PLD), field-programmable gate arrays (FPGA), general-purpose processors, controllers, microcontrollers, microprocessors, other electronic units for performing the foregoing functions, or a combination thereof.

In the form of software implementation, the solutions provided herein can be implemented by the units that perform the foregoing functions. The software code can be stored in the memory, and executed by the processor. The memory can be implemented in the processor or an outside the processor.

It will be appreciated that the units and the algorithmic steps in the foregoing embodiments can be implemented in electronic hardware, or a combination of computer software and electronic hardware. Whether these functions are implemented in hardware or software depends on specific applications and design constraints of the technical solutions. Those skilled in the art can use different methods to implement the functions for each specific application, but these implementations should not be considered beyond the scope of the present disclosure.

It will be appreciated that, for the convenience and conciseness of the description, the specific working process of the system, the apparatus, and the units described above may refer to the corresponding process in the foregoing method embodiments, which is not detailed herein.

In the embodiments of the present disclosure, it will be appreciated that the disclosed apparatus and method can be implemented in other ways. For example, the foregoing apparatus embodiments are merely examples. For example, the division of the modules is based on the logical functions, which may be other division manners according to actual needs. For example, a plurality of modules or components can be combined or integrated into another system. Alternatively, some features are ignored or not executed. In addition, the coupling or direct coupling or communication connection discussed herein may be realized through some interfaces, apparatus or units, and may be in the electrical or mechanical form.

The units described as separate components may be or may not be physically separate, and the components displayed as units may be or may not be physical units, that is, these components may be located in one place, or may be distributed over multiple network units. Some or all of the units can be selected according to actual needs, to realize the objectives of the solutions of the present disclosure.

In addition, each functional unit in each embodiment of the present disclosure may be integrated in one processing unit, or each unit may exist physically alone, or two or more units may be integrated in one unit.

If the function is implemented in the form of software function unit, and is sold or used as an independent product, the function can be stored in a computer-readable storage medium. Therefore, the technical solutions of the present disclosure are essentially or the part that contributes to the related art or the part of the technical solutions can be embodied in the form of software product. The computer software product is stored in a storage medium, including a plurality of instructions, to make a computer device (such as a personal computer, a server, or a network device, and the like) to perform all or part of the steps of the foregoing method. The storage medium includes: a U disk, a mobile hard disk, a ROM, a RAM, a disk or an optical disk and other medium that can store program code. It should be noted that, the relational terms such as "first" and "second" are merely used to distinguish an entity or operation from another entity or operation, and do not imply any actual relationship or order between these entities or operations. Moreover, the terms "including," "comprising," or any other variant thereof are intended to cover non-exclusive inclusions, so that the process, method, article or device including a series of elements includes not only those elements but also other elements not explicitly listed, or includes the elements inherent for the process, method, article or device. Without further limitation, the element defined by the sentence "including one" does not preclude the existence of other identical elements in the process, method, article or device including the element.

The foregoing description is merely the specific embodiments of the present disclosure, to make those skilled in the art understand or implement the present disclosure. Various modifications to these embodiments will be apparent to those skilled in the art. The general principles defined herein may be implemented in other embodiments without departing from the spirit or scope of the present disclosure. Therefore, the present disclosure is not limited to the embodiments provided herein, but will conform to the widest range consistent with the principles and novel features applied herein.

What is claimed is:

1. A COMBO optical network unit (ONU) optical module circuit, comprising:
    a microcontroller unit (MCU) control circuit;
    a 10-gigabit symmetric passive optical network (XG-SPON) ONU circuit; and
    a gigabit passive optical network (GPON) ONU circuit; wherein,
    the MCU control circuit comprises a first control unit, a second control unit, and a third control unit; wherein,
    the first control unit is configured to determine a transmission channel according to a level of an input signal, wherein a high level indicates an XGSPON ONU input state, and a low level indicates a GPON ONU input state;

the second control unit is configured to switch between a TX_SD_10G signal and a TX_SD_1G signal, wherein the TX_SD_10G signal is configured to indicate to switch to the XGSPON ONU input state, and the TX_SD_1G signal is configured to indicate to switch to the GPON ONU input state;

the third control unit is configured to start an optical module, and is further configured to supply power to the GPONG ONU circuit, or supply power to the XGSPONG ONU circuit; and the first control unit is further configured to control the XGSPON ONU circuit through a first serial clock port and a first serial data port in an inter integrated circuit communication mode, or control the GPON ONU circuit through a second serial clock port and a second serial data port in an I2C communication mode;

the XGSPON ONU circuit is configured to receive and emit a 10G optical signal according to the control of the first control unit; and the GPON ONU circuit is configured to receive and emit a 2.5G optical signal according to the control of the first control unit.

2. The COMBO ONU optical module circuit according to claim 1, wherein the XGSPON ONU circuit comprises:
a first low-power burst mode laser driver; and
a mirror current transistor; wherein,
the first low-power burst mode laser driver is connected to a first receiver optical subassembly and a first transmitter optical subassembly respectively, wherein the first receiver optical subassembly is configured to receive the 10G optical signal, and the first transmitter optical subassembly is configured to transmit the 10G optical signal; and
the mirror current transistor is connected to the MCU control circuit and the first receiver optical subassembly respectively.

3. The COMBO ONU optical module circuit according to claim 2, wherein the low-power burst-mode laser driver comprises:
a gold finger TD− port; and
a gold finger RD− port and a gold finger RD+ port; wherein, the gold finger TD− port is an input terminal of a transmitter modulation signal of the XGSPON ONU circuit; and
the gold finger RD− port and the gold finger RD+ port are output terminals of a differential receiving electrical signal of the XGSPON ONU circuit.

4. The COMBO ONU optical module circuit according to claim 2, wherein the mirror current transistor comprises:
a first interface and a second interface; and
a third interface and a fourth interface; wherein,
the first interface and the second interface are connected to a fifth interface, and connected to an RXSLEEP interface of the low-power burst-mode laser driver, and configured to perform current detection on an avalanche photodiode current of the first receiver optical subassembly; and
the third interface and the fourth interface are connected to a sixth interface, and connected to a VAPD interface of the first receiver optical subassembly, and configured for an avalanche photodiode voltage.

5. The COMBO ONU optical module circuit according to claim 2, wherein the XGSPON ONU circuit further comprises:
a field effect transistor;
a diode; and
a first inductor; wherein,
a gate of the field effect transistor is a pulse width modulation input, and is connected to a GDRV port of the third control unit, and a source of the field effect transistor is grounded;
a first end of the diode is connected to a drain of the field effect transistor, and a second end of the diode is grounded through a capacitor and a resistor, wherein the capacitor and the resistor are in parallel connection;
a first end of the first inductor is connected to the drain of the field effect transistor and the first end of the diode, and a second end of the first inductor is connected to a power supply through a second inductor; and
the field effect transistor, the diode, and the inductor form a direct current (DC)-DC voltage boost circuit.

6. The COMBO ONU optical module circuit according to claim 1, wherein the GPON ONU circuit comprises:
a second low-power burst mode laser driver; wherein,
the second low-power burst mode laser driver is connected to a second receiver optical subassembly and a second transmitter optical subassembly, the second receiver optical subassembly is configured to receive the 2.5G optical signal, and the second transmitter optical subassembly is configured to transmit the 2.5G optical signal.

7. The COMBO ONU optical module circuit according to claim 6, wherein the second low-power burst mode laser driver comprises:
a gold finger RD− port and a gold finger RD+ port; and
a gold finger TD+ port; wherein, the gold finger RD− port and the gold finger RD+ port are input terminals of a differential electrical signal of the GPON ONU circuit; and
the gold finger TD+ port is an input terminal of a transmitter electrical signal of the GPON ONU circuit.

8. The COMBO ONU optical module circuit according to claim 6, wherein the second receiver optical subassembly comprises:
a received signal strength indicator (RSSI) port; wherein,
the received signal strength indicator port is connected to a DCV/ADCI port of the second low-power burst mode laser driver, and is configured to monitor a current of an RSSI.

9. The COMBO ONU optical module circuit according to claim 1, wherein the first control unit comprises:
an RX LOS port; wherein,
the RX LOS port is configured to perform optical anomaly detection, and alarm in a case of optical signal loss.

10. The COMBO ONU optical module circuit according to claim 1, wherein the first control unit comprises:
a gold finger H1-4 port; and
a gold finger H1-5 port; wherein,
the gold finger H1-4 port and the gold finger H1-5 port are configured to control the optical module;
the gold finger H1-4 port is configured to receive a serial data (SDA) input; and
the gold finger H1-5 port is configured to receive an external clock input.

* * * * *